(12) United States Patent
Leonhardt

(10) Patent No.: US 7,543,597 B2
(45) Date of Patent: Jun. 9, 2009

(54) VENT VALVE ASSEMBLY WITH LEVER ARRANGEMENT

(75) Inventor: Ralf Leonhardt, Mauldin, SC (US)

(73) Assignee: Alfmeier Corporation, Greenville, SC (US)

( * ) Notice: Subject to any disclaimer, the term of this patent is extended or adjusted under 35 U.S.C. 154(b) by 456 days.

(21) Appl. No.: 11/246,932

(22) Filed: Oct. 7, 2005

(65) Prior Publication Data

US 2007/0079872 A1   Apr. 12, 2007

(51) Int. Cl.
*F16K 24/04* (2006.01)
(52) U.S. Cl. .............................. 137/202; 137/39; 137/43
(58) Field of Classification Search ................. 137/39, 137/43, 202, 448, 587
See application file for complete search history.

(56) References Cited

U.S. PATENT DOCUMENTS

| | | | | |
|---|---|---|---|---|
| 1,471,362 | A | * | 10/1923 | Sartakoff ................. 137/430 |
| 1,941,507 | A | * | 1/1934 | Zahm ....................... 137/202 |
| 2,276,136 | A | * | 3/1942 | Woolley .................. 137/202 |
| 2,344,658 | A | * | 3/1944 | Thiel ....................... 137/202 |
| 3,340,887 | A | * | 9/1967 | Peters ..................... 137/202 |
| 4,753,262 | A | | 6/1988 | Bergsma |
| 4,770,201 | A | | 9/1988 | Zakai |
| 4,886,089 | A | | 12/1989 | Gabrlik et al. |
| 5,027,844 | A | | 7/1991 | Forsythe et al. |
| 5,341,679 | A | | 8/1994 | Walkowski et al. |
| 5,535,772 | A | | 7/1996 | Roetker et al. |
| 5,564,466 | A | | 10/1996 | Aoyama et al. |
| 5,590,697 | A | | 1/1997 | Benjey et al. |
| 5,605,175 | A | | 2/1997 | Bergsma et al. |
| 5,738,132 | A | | 4/1998 | Zakai |
| 5,755,252 | A | | 5/1998 | Bergsma et al. |
| 5,762,090 | A | | 6/1998 | Halamish et al. |
| 5,797,434 | A | | 8/1998 | Benjey et al. |
| 5,850,851 | A | | 12/1998 | Miura et al. |
| 5,860,458 | A | | 1/1999 | Benjey et al. |
| 5,950,655 | A | | 9/1999 | Benjey |
| 5,960,817 | A | | 10/1999 | Johansen et al. |
| 5,983,958 | A | | 11/1999 | Bergsma et al. |
| 5,988,201 | A | * | 11/1999 | Lebkuchner et al. ........ 137/202 |
| 6,003,499 | A | | 12/1999 | Devall et al. |
| 6,062,276 | A | | 5/2000 | Benjey et al. |
| 6,158,456 | A | | 12/2000 | Enge |
| 6,170,510 | B1 | | 1/2001 | King et al. |
| 6,206,057 | B1 | | 3/2001 | Benjey et al. |
| 6,240,950 | B1 | | 6/2001 | Harris |
| 6,371,146 | B1 | | 4/2002 | Benjey |
| 6,439,258 | B1 | | 8/2002 | Decapua |
| 6,508,263 | B1 | | 1/2003 | Jahnke et al. |
| 6,561,211 | B2 | | 5/2003 | Devall |
| 6,578,597 | B2 | | 6/2003 | Groom et al. |

(Continued)

FOREIGN PATENT DOCUMENTS

EP   1323568 A2   7/2003

(Continued)

*Primary Examiner*—John Rivell
*Assistant Examiner*—Craig Price
(74) *Attorney, Agent, or Firm*—Dority & Manning, P.A.

(57) ABSTRACT

A vent valve assembly utilizes a lever arrangement that opens a vapor discharge opening such as during normal operation of a motor vehicle to permit fuel vapor venting and that seals the vapor discharge opening such as when the motor vehicle is inclined to prevent liquid fuel from discharging through the vapor discharge opening.

34 Claims, 5 Drawing Sheets

U.S. PATENT DOCUMENTS

| | | |
|---|---|---|
| 6,581,621 B1 | 6/2003 | Klaffki et al. |
| 6,588,449 B1 | 7/2003 | Kippe |
| 6,591,855 B2 | 7/2003 | Nishi et al. |
| 6,675,779 B2 | 1/2004 | King et al. |
| 6,691,725 B2 | 2/2004 | Zorine |
| 6,701,950 B2 | 3/2004 | Brock et al. |
| 6,701,952 B1 | 3/2004 | Ehrman et al. |
| 6,755,206 B2 | 6/2004 | Nishi et al. |
| 6,776,182 B2 | 8/2004 | Ishitoya et al. |
| 6,779,544 B2 | 8/2004 | Devall |
| 6,848,463 B2 | 2/2005 | Johansen |
| 6,918,405 B2 | 7/2005 | Leonhardt |
| 2002/0069915 A1 | 6/2002 | Gebhardt et al. |
| 2003/0111111 A1 | 6/2003 | Zorine |
| 2004/0149333 A1* | 8/2004 | Johansen .................... 137/202 |
| 2005/0045227 A1 | 3/2005 | Frohwein |
| 2005/0092364 A1 | 5/2005 | Furuya et al. |

FOREIGN PATENT DOCUMENTS

| | | |
|---|---|---|
| EP | 1255941 B1 | 5/2004 |
| WO | WO 0107806 A1 | 2/2001 |
| WO | 2004088187 A1 * | 10/2004 |

\* cited by examiner

VENT VALVE ASSEMBLY WITH LEVER ARRANGEMENT

FIELD OF THE INVENTION

This invention relates to a vent valve assembly for a fuel tank of a motor vehicle. More specifically, the valve assembly utilizes a lever arrangement that selectively opens or closes a vapor discharge opening to permit fuel vapor venting from a vehicle fuel tank or to prevent liquid fuel from discharging through the vapor discharge opening.

BACKGROUND OF THE INVENTION

Environmental concerns and governmental regulations require that motor vehicles have fuel management systems that control fuel tank ventilation to reduce emissions of fuel vapors into the atmosphere and that close when the vehicle is inclined or rolls over to prevent a hazardous liquid fuel leak.

Fuel vapor can be created in the fuel tank by temperature differences between the fuel tank and a liquid fuel from a fuel pump, as well as by sloshing and agitation of the fuel in the fuel tank during normal vehicle operation. The pressure buildup resulting from the creation of fuel vapors must be relieved properly.

Fuel vapor recovery systems are commonly employed to remove excess fuel vapor from the fuel tank. Such systems may include a canister with activated charcoal, which receives fuel vapors through a valve assembly mounted in the top of the fuel tank and which communicates with an intake manifold of the vehicle engine for withdrawing fuel vapor from the fuel vapor recovery canister during operation of the engine.

One conventional valve assembly uses a portion of a float to close or plug its vent opening on an incline or during a rollover to prevent liquid fuel from discharging through the valve assembly into the vapor recovery canister. Responsiveness of the float in closing the vent opening is largely a function of float size, which is often limited by its surrounding valve housing. If the float is sluggish to respond or has an insufficient closing force on the incline or during the rollover, the liquid fuel can discharge through the vent opening.

To reopen the vent opening after the vehicle has been inclined or after the rollover, the typical valve assembly may use a "peel-away" device connected to its float. The peel-away device is intended to avoid reopening problems known in the valve industry. However, the peel-away device may not seal very well due to its flimsy construction.

There is a need in the automotive valve industry for a vent valve that addresses environmental concerns, complies with governmental regulations and exhibits a simple construction so as to be cost-effective and have a long service life.

BRIEF SUMMARY OF THE INVENTION

The present invention provides a lever vent valve (LVV) assembly for a fuel tank of a vehicle that seals a fuel vapor discharge opening in the LVV when the vehicle is on a grade or incline or during a rollover condition to prevent liquid fuel from discharging through the fuel vapor discharge opening in the LVV. Moreover, the LVV assembly reopens after the fuel tank of the vehicle returns to a substantially horizontal position to permit fuel tank venting. The component parts of the LVV assembly are simple and economical to manufacture, assemble, and use. Other advantages of the invention will be apparent from the following description and the attached drawings, or can be learned through practice of the invention.

According to one aspect of the invention, a vent valve assembly for attachment in an aperture of a fuel tank wall is provided. The vent valve assembly includes a cap member defining a vapor-inlet opening and a vapor-outlet opening therethrough configured for selective passage of a fuel vapor from an interior of a fuel tank; a valve housing attachable to the cap member, the valve housing defining a chamber therein and at least partially disposed within the interior of the fuel tank; a float disposed in the chamber of the valve housing and responsive to a first vehicle condition and a second vehicle condition; a lever arm having a first end and a second end, the first end connected proximate the valve housing and the cap member, the float connected proximate the second end; and a sealing surface disposed proximate the lever arm and movable relative to the vapor-inlet opening to open and close the vapor-inlet opening respectively in the first vehicle condition and in the second vehicle condition. Also in this aspect, the valve housing includes a fuel vapor entry aperture in communication with the vapor-inlet opening to pass the fuel vapor through the vapor-outlet opening in the first vehicle condition.

In this aspect of the invention, the valve housing defines a plurality of drainage holes, which permit drainage of a liquid fuel accumulated in the chamber in the second vehicle condition to actuate the float such that the sealing surface disengages from about the vapor-inlet opening in the first vehicle condition. In this aspect, a first movement of the float moves the sealing surface in a direction away from the vapor-inlet opening to disengage the sealing surface from about the vapor-inlet opening in the first vehicle condition to permit fuel vapor discharge from the interior and a second movement of the float moves the sealing surface in a direction of the vapor-inlet opening in the second vehicle condition to prevent a liquid fuel from discharging through the vapor-inlet opening and the vapor-outlet opening.

In another aspect of the invention, a vent valve assembly for attachment in an aperture of a fuel tank wall includes a cap member defining a vapor-inlet opening and a vapor-outlet opening therethrough; a valve housing attachable to the cap member, the valve housing defining a chamber therein and at least partially disposed within an interior of a fuel tank; a float being disposed in the chamber of the valve housing and responsive to a first vehicle condition and a second vehicle condition; a leveraged sealing device movable relative to the vapor-inlet opening to open and close the vapor-inlet opening respectively in the first vehicle condition and in the second vehicle condition; and means for connecting the float and the leveraged sealing device such that a first movement of the float moves the leveraged sealing device in a direction away from the vapor-inlet opening to disengage the leveraged sealing device from about the vapor-inlet opening in the first vehicle condition to permit fuel vapor discharge from the interior and a second movement of the float moves the leveraged sealing device in a direction of the vapor-inlet opening in the second vehicle condition to prevent a liquid fuel from discharging through the vapor-inlet opening and the vapor-outlet opening. In this aspect, the means for connecting can include a lever arm defining a proximal end and a distal end, the leveraged sealing device interposed between the proximal end and the distal end, the proximal end rotatably connected proximate the cap member and the valve housing, the distal end rotatably engaged with the float.

Also in this aspect of the invention, the float can define a catch member and a hangar, the hangar of the float configured to move the distal end in a direction away from the vapor-inlet opening to disengage the leveraged sealing device from about the vapor-inlet opening, the catch member configured to move the distal end in a direction of the vapor-inlet opening in the second vehicle condition such that the leveraged sealing device becomes substantially parallel to an outside diameter of the vapor-inlet opening to seal the vapor-inlet opening upon initial contact.

Further in this aspect of the invention, the leveraged sealing device can be spaced apart from the vapor-inlet opening from about 1 mm to about 8 mm in the first vehicle condition, the proximal end of the lever arm connected proximate the cap member and the valve housing such that a rotation of the lever arm limits an axial movement of the float from about 2 mm to about 16 mm in the second vehicle condition.

In another aspect of the invention, a vent valve assembly for attachment in an aperture of a fuel tank wall includes a cap member defining a vapor-inlet opening and a vapor-outlet opening therethrough for selective passage of a fuel vapor from an interior of a fuel tank; a valve housing attachable to the cap member, the valve housing defining a longitudinal axis and a chamber therein and at least partially disposed within the interior of the fuel tank; a float defining a hangar and a catch member, the float being disposed in the chamber of the valve housing and responsive to a first vehicle condition and a second vehicle condition; and a lever arm defining a proximal end, a distal end and a sealing surface therebetween, the proximal end pivotally connected proximate the cap member and the valve housing, a portion of the lever arm proximate the distal end rotatably engaged with the hangar of the float, the hangar of the float configured to move the portion of the lever arm in a direction away from the vapor-inlet opening to disengage the sealing surface from about the vapor-inlet opening in the first vehicle condition to permit the fuel vapor to discharge from the interior of the fuel tank, the catch member configured to move the distal end in a direction of the vapor-inlet opening in the second vehicle condition such that the sealing surface seals the vapor-inlet opening to prevent discharge of a liquid fuel from the interior of the fuel tank. In this aspect, the vapor-inlet opening can be formed about the longitudinal axis of the valve housing, the portion of the lever arm spaced apart from the vapor-inlet opening.

Also in this aspect of the invention, the chamber of the valve housing has an inner diameter. The portion of the lever arm is spaced apart from the vapor-inlet opening at a distance of at least about one-half of the inner diameter. Further in this aspect, the valve housing defines a cradle, the proximal end rotatably disposed in the cradle. The float in this aspect can have a perimeter, and the catch member can extend from proximate the perimeter.

Further in this aspect of the invention, the distal end has a first surface and a second surface. The first surface is rotatably engaged with the hangar, and the second surface is engageable with the catch member.

The lever assembly in this aspect of the invention further includes a sealing block attached to the lever arm. The sealing block is angled in cross-section, and the sealing surface is located on the sealing block. The lever arm is spaced apart from the vapor inlet opening such that the longitudinal axis extends through the sealing block to align the sealing surface with the vapor-inlet opening.

Also in this aspect of the invention, the vent valve assembly can have a resilient lip member defined about the vapor-inlet opening. The sealing surface seals about the resilient lip member to close vapor-inlet opening in the second vehicle condition. Further in this aspect, the sealing surface has a surface area larger than an outside diameter of the resilient lip member. The resilient lip member is overmolded with the cap member. The resilient lip member can also be formed to flare circumferentially away from the vapor-inlet opening and to flatten between a base of the cap member and the sealing surface in the second vehicle condition. Moreover, the resilient lip member can be positioned substantially flush with the base of the cap member. The resilient lip member can also be circumferentially chamfered.

Also in this aspect of the invention, a vehicle in the first vehicle condition is on a substantially horizontal plane. A vehicle in the second vehicle condition is on a grade of at least 10 degrees from a horizontal plane.

Further in this aspect of the invention, the valve housing defines a fuel vapor entry aperture therethrough, the fuel vapor entry aperture in communication with the vapor-inlet opening to pass the fuel vapor through the vapor-outlet opening in the first vehicle condition.

The valve housing in this aspect has a plurality of drainage holes through it. The drainage holes are configured in the first vehicle condition to drain the liquid fuel accumulated in the chamber during the second vehicle condition to actuate the float such that the sealing surface disengages from about the vapor-inlet opening. In this aspect, the sealing member is spaced apart from the vapor-inlet opening from about 1 mm to about 8 mm in the first vehicle condition, and the proximal end of the lever arm is connected proximate the cap member and the valve housing such that a rotation of the lever assembly limits an axial movement of the float from about 2 mm to about 16 mm in the second vehicle condition.

In a further aspect of the invention, a vent valve assembly for attachment in an aperture of a fuel tank wall includes a cap member defining a vapor-inlet opening and a vapor-outlet opening therethrough for selective passage of a fuel vapor from an interior of a fuel tank, the vapor-inlet opening defining an outside diameter; a valve housing attachable to the cap member, the valve housing defining a longitudinal axis and a chamber therein and at least partially disposed within the interior of the fuel tank; a float defining a catch member and a hangar depending from proximate the catch member, the float being disposed in the chamber of the valve housing and responsive to a first vehicle condition and a second vehicle condition; and a lever assembly including a lever arm defining a proximal end and a distal end and a sealing device interposed between the proximal end and the distal end, the proximal end rotatably connected proximate the cap member and the valve housing, the sealing device defining a sealing surface thereon, the lever arm and the sealing surface disposed in respective intersecting planes, the lever arm spaced apart from the vapor inlet opening such that the longitudinal axis extends through the sealing device to align the sealing surface with the vapor-inlet opening, the distal end rotatably engaged with the hangar of the float, the hangar of the float configured to move the distal end in a direction away from the vapor-inlet opening to disengage the sealing surface from about the vapor-inlet opening in the first vehicle condition to permit fuel vapor discharge from the interior of the fuel tank, the catch member configured to move the distal end in a direction of the vapor-inlet opening in the second vehicle condition such that the sealing surface becomes substantially parallel to the outside diameter to seal the vapor-inlet opening to prevent fuel vapor discharge from the interior of the fuel tank.

Also in this aspect of the invention, the chamber of the valve housing has an inner diameter, and the distal end is spaced apart from the vapor-inlet opening at a distance of at about one-third to about one-half of the inner diameter. The valve housing defines a cradle, and the proximal end is rotatably disposed in the cradle. The float in this aspect has a perimeter, the catch member depending from proximate the perimeter, the distal end defining a first surface and a second surface, the first surface rotatably engaged with the hangar, the second surface engageable with the catch member.

Further in this aspect of the invention, the vent valve assembly can include a resilient lip member defined about the vapor-inlet opening, the sealing surface being larger than an outside diameter of the resilient lip member and configured to seal about the outside diameter of the resilient lip member to close vapor-inlet opening in the second vehicle condition. The resilient lip member can be overmolded with the cap member.

Also in this aspect of the invention, the valve housing can have a fuel vapor entry aperture in communication with the vapor-inlet opening to pass the fuel vapor through the vapor-outlet opening in the first vehicle condition. The valve housing can also have a plurality of drainage holes that are configured to drain the liquid fuel accumulated in the chamber in the second vehicle condition to actuate the float such that the sealing surface disengages from about the vapor-inlet opening in the first vehicle condition.

The sealing member in this aspect of the invention is spaced apart from the vapor-inlet opening from about 1 mm to about 8 mm in the first vehicle condition, the proximal end of the lever arm connected proximate the cap member and the valve housing such that a rotation of the lever assembly limits an axial movement of the float from about 2 mm to about 16 mm in the second vehicle condition.

Further in this aspect of the invention, the vent valve assembly can have an annular ring depending from the valve housing. The annular ring can be a metal configured to press into a portion of the cap member to hold the valve housing and the cap member together and to seal off communication between the valve housing and an external atmosphere.

Other aspects and advantages of the invention will be apparent from the following description and the attached drawings, or can be learned through practice of the invention.

BRIEF DESCRIPTION OF THE DRAWINGS

The above and other aspects and advantages of the present invention are apparent from the detailed description below and in combination with the drawings in which.

DETAILED DESCRIPTION OF THE INVENTION

Figure 1:
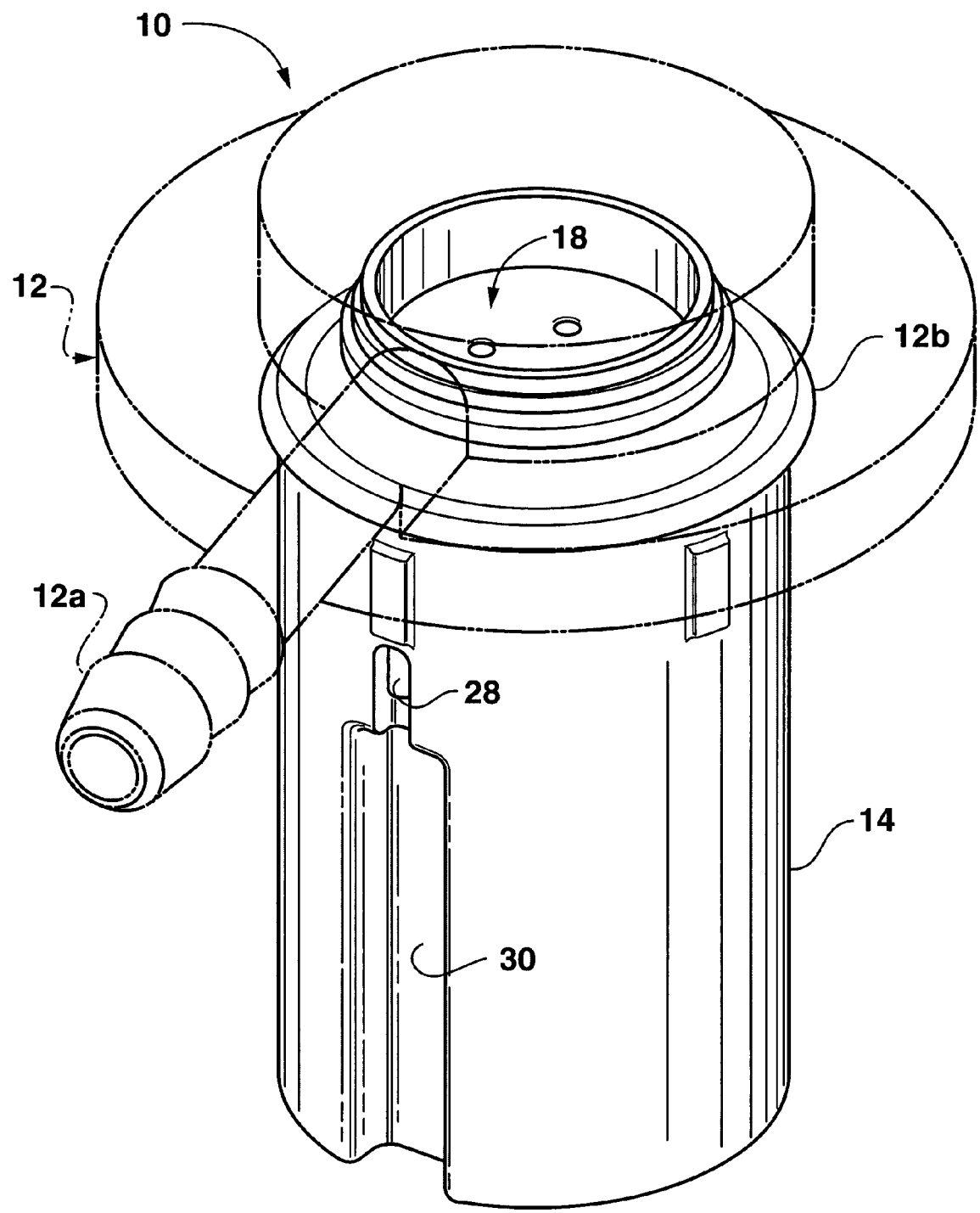
FIG. 1 is a top perspective view of an embodiment of a vent valve assembly for a vehicle fuel tank according to an aspect of the invention.

Detailed reference will now be made to the drawings in which examples embodying the present invention are shown. The detailed description uses numerical and letter designations to refer to features in the drawings. Like or similar designations in the drawings and description have been used to refer to like or similar parts of the invention.

The drawings and detailed description provide a full and detailed written description of the invention, and of the manner and process of making and using it, so as to enable one skilled in the pertinent art to make and use it, as well as the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents.

As broadly embodied in the figures, a lever vent valve (LVV) is provided to control ventilation of a fuel tank in response to an over-pressure condition within the fuel tank, or to close when the vehicle is on an incline, grade, hill or the like, or during a vehicle rollover. Thus, the LVV assembly in one aspect of the invention is installed in a vapor space of a fuel tank to provide restricted fuel vapor venting during normal operation of the vehicle, or to prevent liquid fuel from discharging through the LVV assembly to a fuel vapor recovery system in an incline or rollover situation.

FIGS. 1-4 show a LVV assembly designated in general by the element number 10. The LVV assembly 10 is attached in an area of an expansion chamber or vapor space of a fuel tank T and generally includes a cover or cap member 12, a valve housing 14, a lever assembly 20 and a float assembly 22. Accordingly, the LVV assembly 10 permits the fuel tank T to vent its vapors such as during a hot day in which the liquid fuel and fuel vapor within the fuel tank T expand due to heating. The LVV assembly 10 also closes when the vehicle is inclined such as when parked on a grade to prevent the liquid fuel in the fuel tank T from discharging through the LVV assembly 10 and into a fuel vapor recovery apparatus (not shown). Moreover, the LVV assembly 10 closes in the event of a vehicle rollover to prevent the liquid fuel from spilling through the LVV assembly 10 and contaminating the environment.

When the vehicle and the LVV assembly 10 are returned to a substantially horizontal position after being on the grade or after the rollover, the LVV assembly 10 quickly reopens to reestablish fuel tank vapor venting. The foregoing and other aspects and components of the LVV assembly 10 are described in greater detail and by example operation below.

FIG. 1 shows in general the LVV assembly 10 with the cap member 12 attached to the housing 14. In this example, the valve housing 14 is approximately 40-50 millimeters (mm) in height and at least a portion of the housing 14 extends into the expansion chamber of the fuel tank T. Also shown, a nozzle 12a and a ring or weld pad 12b extend from the cap member 12. The nozzle 12a is attached to a hose or other conduit (not shown) to communicate fuel vapor from the LVV assembly 10 to the fuel vapor recovery apparatus.

Figure 2:
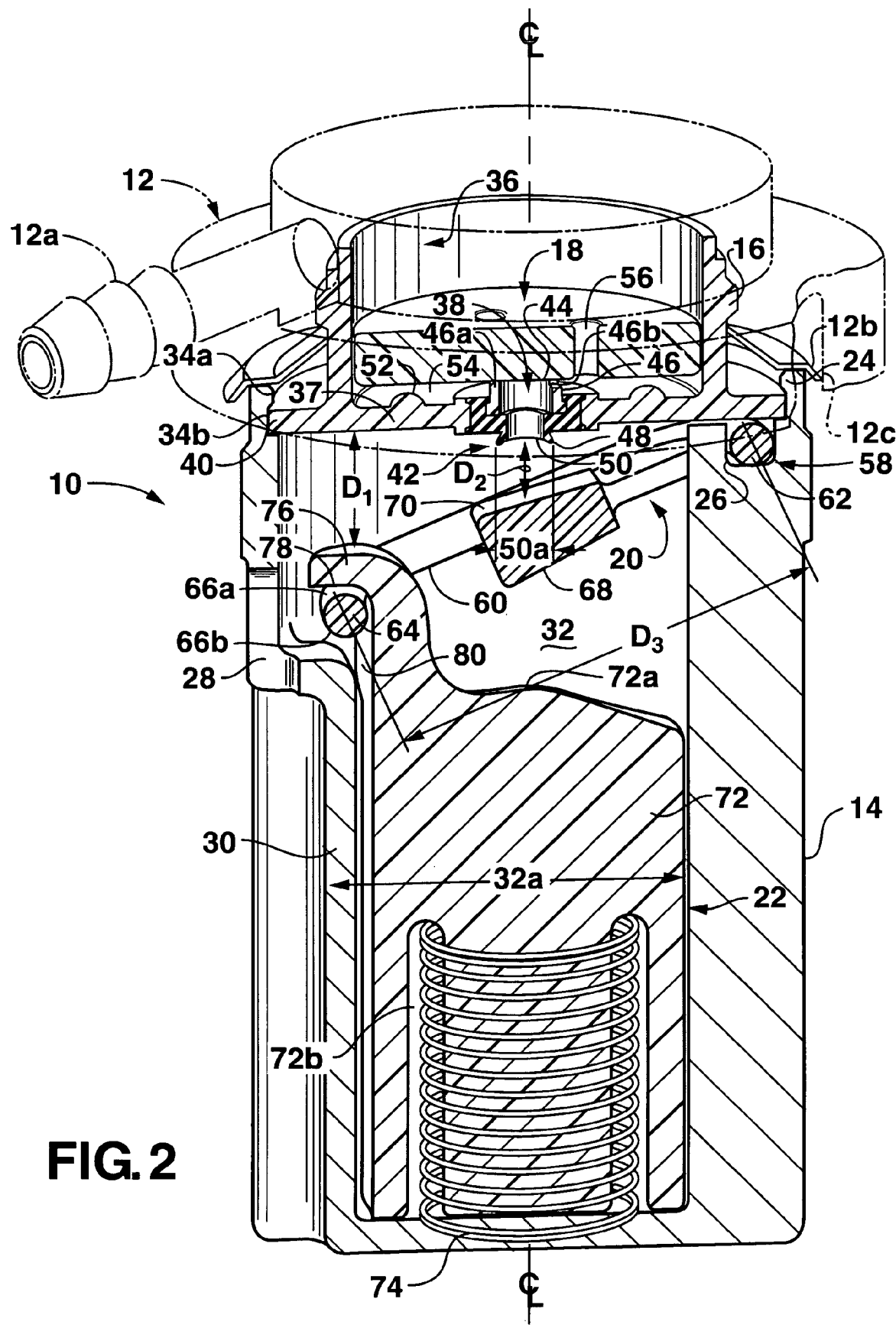
FIG. 2 is an elevational view of the vent valve assembly as in FIG. 1 shown in partial cross section in a first vehicle condition permitting fuel vapor venting.

With more particular reference to FIGS. 1 and 2, the weld pad 12b can be ultrasonically, hot plate or spun welded to a wall of the fuel tank T, or press fit or snap-fit as in this example. As shown, the cap member 12 is attached to the housing 14 by a weld surface 24 of the housing 14 to the weld pad 12b, and the weld pad 12b is snap-fit into an inner wall 12c of the cap member 12. By welding the weld pad 12b and the housing 14 together at the weld surface 24, an O-ring or similar sealing device can be avoided to simplify manufacture and assembly of the LVV assembly 10. Also in this aspect of the invention, the cap member 12 and its weld pad 12b can be made of high-density polyethylene (HDPE). Additionally, one or more layers of ethylene vinyl alcohol copolymer (EVOH) resin can be embedded in the HDPE by extrusion, or the EVOH can be layered on the HDPE such as by lamination. EVOH is characterized by its gas barrier properties and by its resistance to solvents, chemicals and the like. An EVOH resin is available, for instance, under the brand name EVAL™ from Eval Europe N. V. Nin Zwijndrecth, Belgium, although suitable resins from other sources can be substituted for the EVAL™ brand resin.

FIGS. 1 and 2 further show a disc 18 having a plurality of apertures 56, which are sized and arranged in an interface 16 connecting the cover 12 and the housing 14 in this example. The disc 18 and its apertures 56 permit fuel vapor venting from the LVV 10 during an over-pressure condition in the fuel tank T as described further below.

Also shown in FIGS. 1 and 2, the housing 14 defines a vapor entry aperture 28, which in this aspect of the invention is a slot approximately 5 mm or greater in diameter or length. Those skilled in the art will instantly appreciate that the fuel vapor entry aperture 28 is sized to dictate a rate of fuel vapor discharge into the housing 14 and through the nozzle 12a. However, the fuel vapor entry aperture 28 can assume various shapes such as square, rectangular, oval or the like. Moreover, additional fuel vapor entry apertures can be formed in the housing 14 to control the rate of fuel vapor discharge according to particular customer requirements.

The housing 14 in FIGS. 1 and 2 also defines a guide channel 30 that projects into a chamber 32 of the housing 14 to axially stabilize a float 72 as the float 72 moves within the chamber 32. The skilled artisan will appreciate that the valve housing 14 as well as the float 72 can be made smaller or larger and shaped differently than the example shown to accommodate various manufacturing and customer requirements.

With particular reference to FIG. 2, various components of the LVV assembly 10 are most clearly shown in a resting or first vehicle condition. In this aspect of the invention, portions of the float assembly 22 and the lever assembly 20, when resting, are spaced apart respective distances $D_1$ and $D_2$ from the interface 16. Also shown, the disc 18 briefly introduced above sits upon a circumference 46a defined about a vent aperture or vapor inlet opening 38 formed in the base 37. The circumference 46a defines a cut-out or bypass 46b for bleed passage of fuel vapor as discussed below. One or more protrusions 52 defined on the base 37 of the interface 16 form a space 54 between the disc 18 and the base 37 and serve to stabilize the disc 58.

In operation, the fuel vapor enters through the vapor entry opening 28, passes through the chamber 32 and into the vent aperture 38. Under normal vehicle conditions, the fuel vapor bleeds through the bypass 46b and out through the disc apertures 56. In another operation, when an over-pressure condition develops in the fuel tank T, the fuel vapor enters through the vapor entry aperture 28 and continues through the vent aperture 38. However, when the over-pressurized fuel vapor is too great for the bypass 46b, the fuel vapor forces the disc 18 upward at least momentarily for some of the fuel vapor to vent through the disc apertures 56 and exit through the nozzle 12a. Reference is made to U.S. Pat. No. 6,758,235, also assigned to the assignee of the present application for further discussion and exemplary operation of a disc similar to disc 18.

FIG. 2 further shows a neck 36 extending from the base 37 of the interface 16. As discussed above, the neck 36 is attached to the ring 12b, and the ring 12b holds the cap member 12 by digging or "biting" into the wall 12c. In this aspect of the invention, an annular projection 40 extending from the base 37 is snapped into a run 34b, which is formed in a snap 34a of the housing 14 to hold the interface 16 in position relative to the housing 14. By way of further example and not limitation, the cap member 12, the housing 14 and the interface 16 can be attached together in a variety of ways as described in U.S. patent application Ser. No. 10/651,077, assigned to the assignee of the present application. Those skilled in the art will therefore appreciate that the components of the LVV assembly 10 can be attached in a number of ways and further explanation is not necessary to understand and practice this aspect of the invention.

FIG. 2 also shows an overmolded seal 42 formed in the base 37 of the interface 16 about the vent aperture 38. The seal 42 is overmolded in the base 37 in part to simplify manufacturing. As shown, the overmolded seal 42 includes an upper or outer seal 44 defining a first circumferential lip 46 and a lower or inner seal 48 defining a resilient lip member or second lip 50 that further defines an outside diameter 50a, which will be described further by example operation below.

Also shown in FIG. 2, the lever assembly 20 includes a lever arm 60 and a sealing block 68. In this example, the lever arm 60 defines a proximal end 62 (alternatively, first end or pivot), which is spaced apart from a distal end 64 (alternatively, second end, finger, bar or hanger) at a distance $D_3$. As shown, the distance $D_3$ is approximately equal to an inner diameter 32a of the chamber 32 of the housing 14. Also shown, the proximal end 62 sits in a cradle 26 formed in the housing 14. The cradle 26 and the proximal end 62 therefore define a fulcrum point 58. This arrangement creates a relatively large moment that urges a rotation of the lever arm 60 at the fulcrum point 58, which may be better understood with reference to a moment arm corresponding to the moment.

The moment arm of the lever assembly 20 is a perpendicular distance between a line of action of a force and a center of the moment. A magnitude of the moment of the force acting about a point, such as the fulcrum point 58 in this aspect of the invention, is directly proportional to the distance of the force from the fulcrum point 58. Therefore, the magnitude of the moment of the lever assembly 20 can be defined as the product of the force and the moment arm expressed as:

magnitude of moment=force×distance=$F \times d$.

If the moment is to be taken about the fulcrum point 58 due to the force, then in order for the moment to develop, the line of action of the force cannot pass through the fulcrum point 58. Alternatively, if the line of action does go through the fulcrum point 58, the moment is zero because the magnitude of the moment arm is zero; thus, no movement will occur.

In view of the foregoing definition, if two people, for example, stand on respective ends of a playground seesaw that is movably attached to a central rotation point, and if both people each weigh 200 pounds (lbs) and each stand 4 feet (ft.) away from the center rotation point on their respective ends, each person creates a moment of 800 ft.-lbs (200 pounds×4 feet). The center of the moments in this example is zero because 800 ft.-lbs minus 800 ft.-lbs result in a total moment of zero; i.e., a state of equilibrium exists on the seesaw.

If one person jumps off the seesaw, the weight of the remaining person will no longer be counterbalanced. The end of the seesaw with the remaining person will quickly fall. In other words, the force (weight) of the person still standing on the seesaw will have created a moment as defined above. Similarly, in the example shown in FIG. 2, the weight of the float assembly 22 multiplied by the distance $D_3$ creates a relatively large moment arm that maintains the LVV assembly 10 in the open, first vehicle condition, or quickly and forcefully opens the LVV assembly 10 after a closed, second vehicle condition, which is described further with respect to FIG. 4 below.

With continued reference to FIG. 2, the housing 14 also defines a longitudinal axis or centerline $C_L$ that is substantially aligned with the vent aperture 38 and the sealing block 68. In this example, the sealing block 68 is attached to the lever arm 60, which curves around and away from the centerline $C_L$ in order to position the sealing block 68 in line with the overmolded seal 42 and the vent aperture 38. As shown, the sealing block 68 defines a sealing surface 70, which lies in a plane that intersects a plane of the lever arm 60. In other words, the lever arm 60 and the sealing surface 70 are not quite parallel to each other in this example. As described with respect to FIG. 4 below, this arrangement permits the sealing surface 70 to become substantially parallel to the resilient lip member 50 when the LVV assembly 10 transitions to the second vehicle condition.

Figure 3:
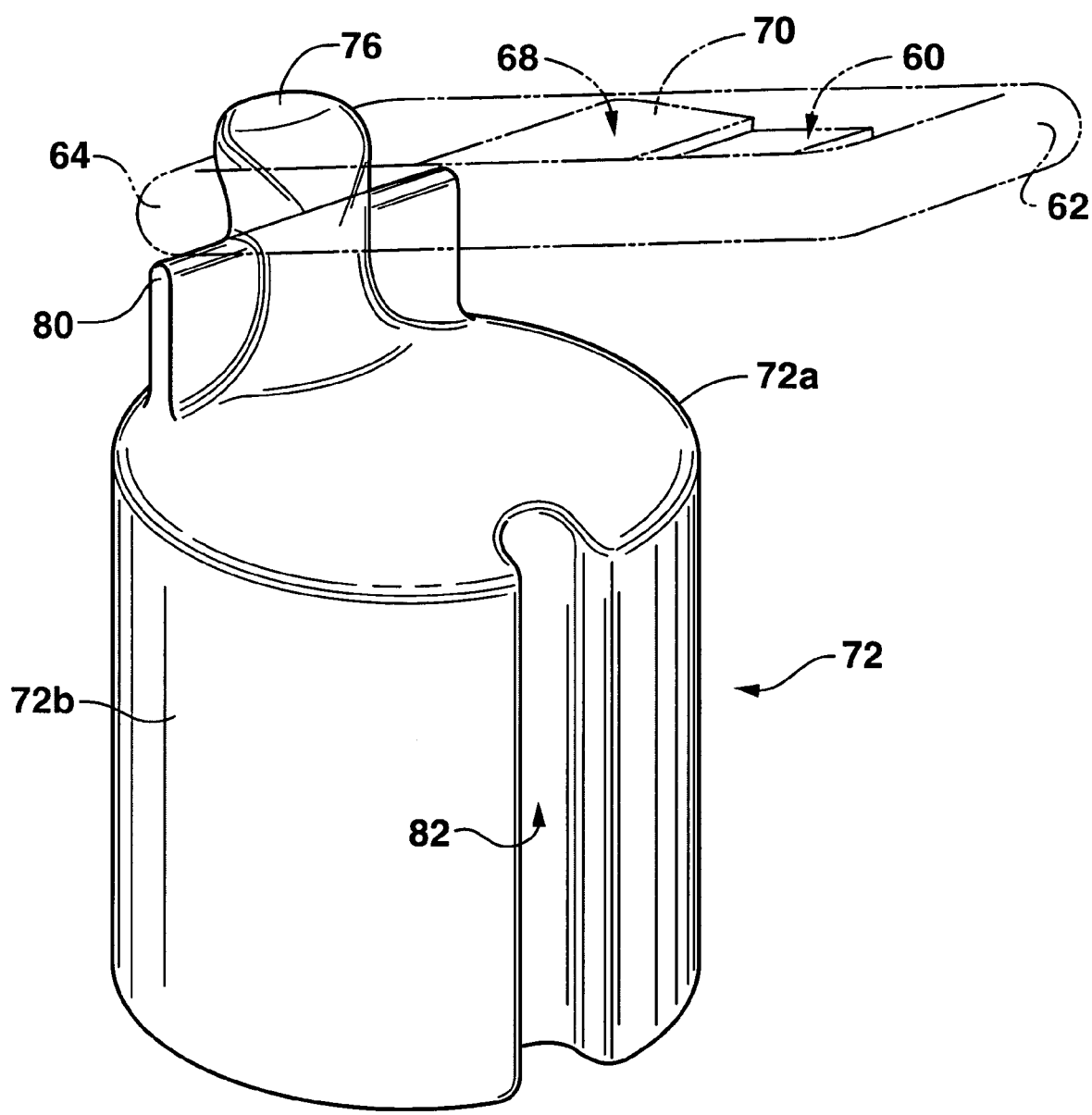
FIG. 3 is a top perspective view of a float of the vent valve assembly as in FIG. 2 according to an aspect of the invention.

As shown most clearly in FIG. 3, the lever arm 60 and the sealing block 68 are formed symmetrically. Accordingly, assembly of the lever arm 60 and the float 72 is simplified since there is no "upper" or "lower" surface of the lever arm 60 to orient for assembly; i.e., either side of the sealing block 68 can be used as the sealing surface 70. Moreover, because the sealing block 68 is angled, the lever arm 60 can be attached in the fulcrum point 58 relatively higher in the housing 14 with more float clearance relative to the base 37. As shown, the distance $D_1$ is less than would be required if a sealing surface were arranged substantially parallel with the lever arm 60; thus, the example in FIG. 3 provides a more compact sealing arrangement.

Those skilled in the valve art will readily appreciate that the lever arm 60 can be shaped differently than the foregoing example. For instance, the lever arm 60 can be substantially straight bar between its proximal end 62 and its distal end 64 such that the lever arm 60 intersects the centerline $C_L$ with the sealing surface 70 attached to the lever arm 60 in line with the vent aperture 38. Accordingly, in another aspect of invention, the distal end 64 of the lever arm 60 can be hooked or C-shaped for interaction with the float 72 rather than bending the entire lever arm 60 around the vent aperture 38.

With reference now to both FIGS. 2 and 3, the float 72 defines a perimeter or upper surface 72a from which a float hanger 76 (alternatively, projection or hook) extends. As shown, the upper surface 72a extending to the hanger 76 is angled or cone-shaped to facilitate rapid drainage of any liquid fuel from the float 72. Also shown, a catch or wing 80 is formed with or near the hanger 76 to interact with the distal end 64 of the lever arm 60 as described with respect to FIG. 4 below.

As shown in FIGS. 2 and 3, the float 72 also defines a float guide channel 82 that interacts with a guide channel (not shown) of the housing 14 similar to the guide channel 30 of the housing 14 to axially align the float 72 during movement between the first and second vehicle conditions and to prevent rotation of the float 72 in the housing 14. As shown, the float 72 further includes a spring compartment 72b, which houses a spring 74. The spring 74 defines a spring constant to urge the float 72 upward in conjunction with a preset buoyancy of the float 72 if liquid fuel enters the chamber 32 such as in an inclined vehicle condition. Those skilled in the art will appreciate that the spring 74 will have a sufficiently weak spring constant so as not to bias the float 72 upward when no liquid fuel is present in the chamber 32.

FIGS. 2 and 3 further show a first or upper curved surface 66a of the distal end 64 curves around to define a second or lower curved surface 66b. A complementary curved surface 78 of the float hanger 76 rotates about and hangs on the first curved surface 66a to maintain the LVV assembly 10 in the open condition shown in FIG. 2. As particularly shown in FIG. 3, the catch 80 interacts with the second curved surface 66b of the hanger extension 64 to buoy or push the lever assembly 20 in a direction of the lip 50 in the second vehicle condition.

Figure 4:
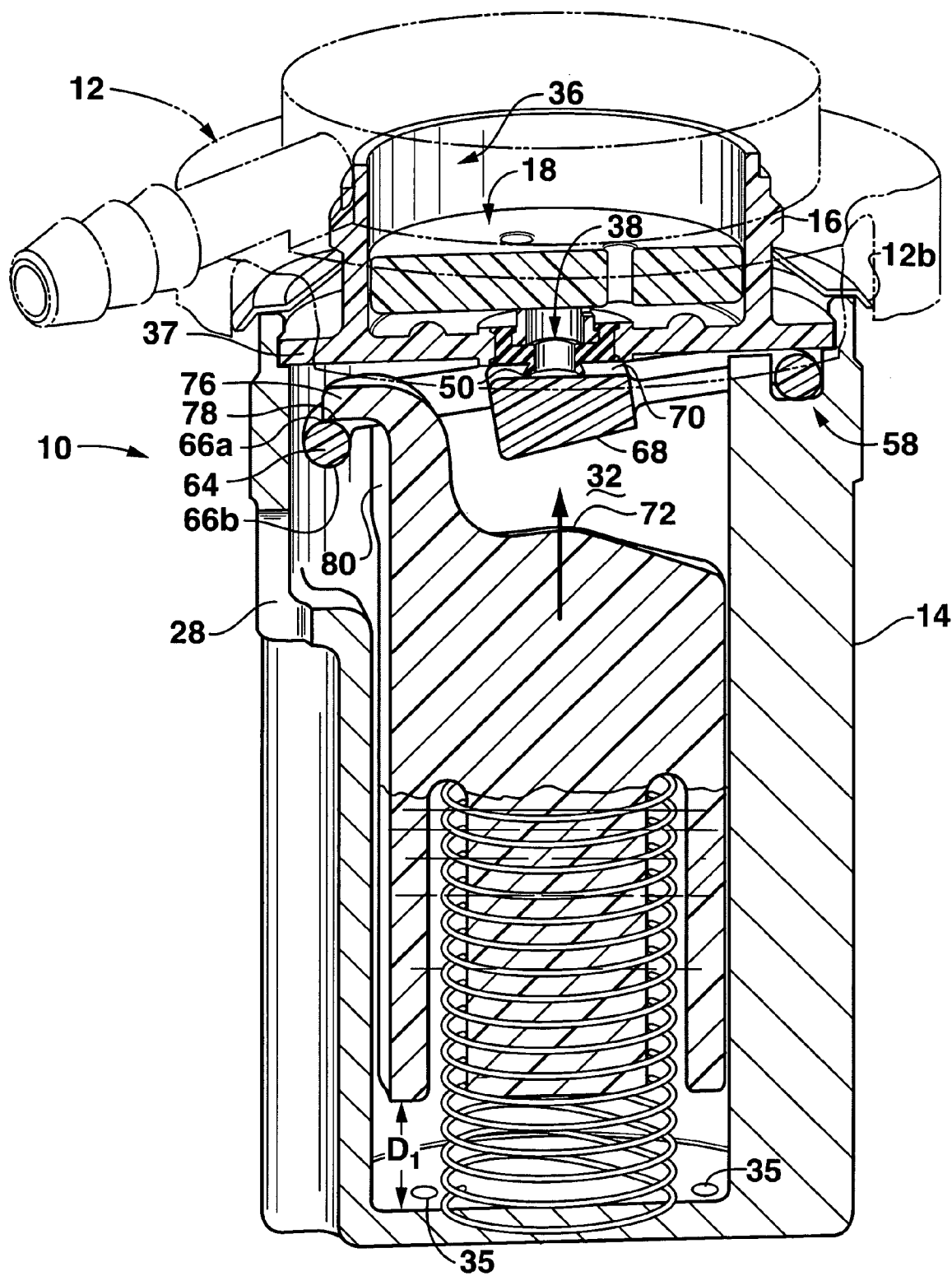
FIG. 4 is an elevational view of the vent valve assembly as in FIG. 2 showing a second vehicle condition in partial cross section in which the vent valve assembly is closed to prevent discharge of liquid fuel.

Turning now to FIG. 4, the LVV assembly 10 is shown in the closed or second vehicle condition briefly introduced above. As noted above, the second vehicle condition occurs in an inclined vehicle condition or during a vehicle rollover. As shown, the sealing surface 70 of the sealing block 68 is completely sealed about the outside diameter 50a of the lip 50 to close the vapor inlet opening 38 to prevent liquid fuel from discharging through the vapor inlet opening 38 and into a fuel vapor recovery apparatus via the nozzle 12a. In this example, the sealing surface 70 has a greater surface area than the outside diameter 50a in order to completely seal the lip 50 notwithstanding any axial or radial movement of the float 72 due to manufacturing tolerances. Also in this example, the float 72 has transited the maximum axial distance $D_1$ introduced with respect to FIG. 2 above and has been halted by its float hanger 76 contacting the base 37 of the interface 16.

FIG. 4 further shows a plurality of drainage holes 35, which when the vehicle is returned to a substantially horizontal orientation, allows any liquid fuel in the chamber 32 to drain back into the tank interior. Once any liquid fuel is expelled and no longer buoying the float 72, the float hanger 76 of the float 72 will descend in a first venting stage away from the base 37 to rest on the first curved surface 66a of the hanger extension 64. The weight of the float 72 coupled with the weight of the spring 74, if installed, create a large moment arm that quickly overcomes any pressure differential between the chamber 32 and the neck 36. Accordingly, the sealing surface 70 forcefully releases at once from about the diameter 50a in a second venting stage to quickly reopen the LVV assembly 10 as shown in FIG. 2.

Figure 5:
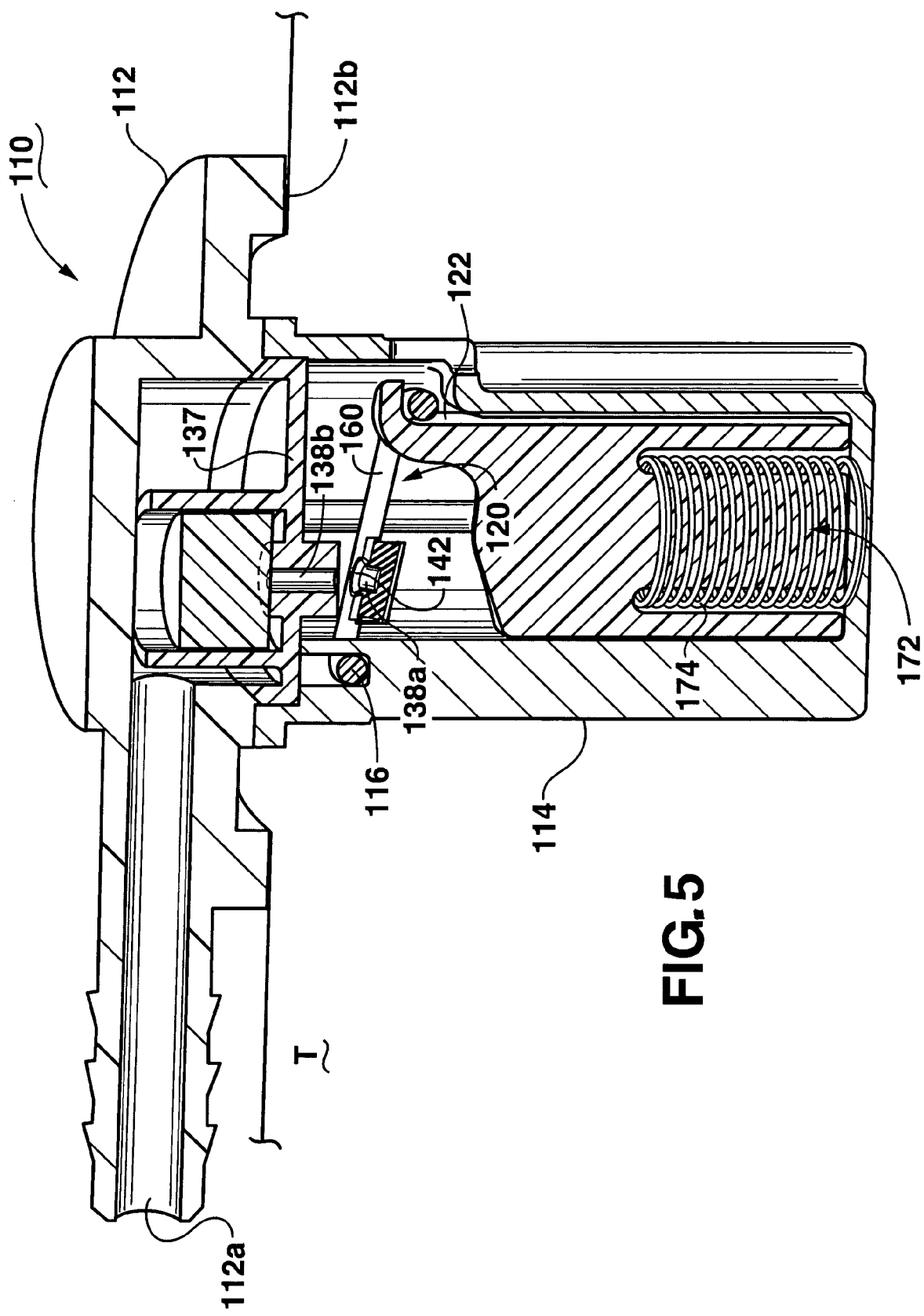
FIG. 5 is an elevational view of a vent valve assembly according to another aspect of the invention.

In another embodiment of the invention shown in FIG. 5, a lever vent valve (LVV) assembly 110 is provided. This LVV assembly 110 is similar in some ways to the embodiment described above. Therefore, only certain differences between the embodiments are described below for the sake of brevity and reference is made to the foregoing descriptions for like or similar components of the LVV 110.

As shown in FIG. 5, the valve assembly 110 generally includes a cap member 112, a valve housing 114, an interface 116, a lever assembly 120 and a float assembly 122. The valve assembly 110 generally operates according to a first vehicle condition and a second vehicle condition somewhat similar to the vehicle conditions described above. However, the LVV assembly 110 differs in at least one respect from the previously described embodiment in that a seal 142 is overmolded on a lever arm 160 of the lever assembly 120. As shown, the seal 142 includes a passageway 138a, which operates in concert with a vapor inlet opening 138b formed in a base 137 of the interface 116. More particularly, when the valve assembly 110 is closed in the second vehicle condition, the passageway 138a and the vapor inlet opening 138b are sized to permit a fuel vapor bleed to equalize pressure between the valve housing 114 and an external atmosphere when the vehicle returns to a substantially horizontal position. This pressure equalization arrangement coupled with a moment arm defined by the lever assembly 120 and the float assembly 122 forcefully releases the seal 142 from about passageway 138b to reopen the valve assembly 110. By way of further example and not limitation, an operation of a dual stage reopening seal such as seal 142 is described in U.S. patent application Ser. No. 10/727,716, also assigned to the assignee of the present application.

The above and other aspects of the invention may be better understood with reference to an exemplary operation of the LVV assembly 10.

As shown in FIG. 2, the LVV assembly 10 is in the resting or first vehicle condition during normal operation of the vehicle as introduced above. In this aspect of the invention, the vehicle is substantially horizontal; i.e., no more than about 10° from horizontal. Due to the distance $D_3$ between the fulcrum 58 and the hanger extension 64 and the weight of the float 72 and the spring 74 hanging on the lever arm 60, the resultant moment arm maintains the float 72 in the open condition. Thus, fuel vapor from the interior of the fuel tank T enters the fuel vapor entry aperture 28 and passes through the vent aperture 38 and the bypass 46*b* to vent regularly during normal vehicle operation or if an overpressure condition exists in the interior of the fuel tank T to lift the disc 18 from the lip 46 to allow the fuel vapor to vent through the disc apertures 56 and out the nozzle 12*a*.

As shown in FIG. 4, when the vehicle is inclined or rolls over, the float 72 is either buoyed or projected by gravity toward the vapor inlet opening 38 in the second vehicle condition. Accordingly, the wing 80 attached to the float 72 contacts the second curved surface 66*b* of the hanger extension 64 to urge the lever arm 60 upward, which in turn urges the sealing block 68 and its sealing surface 70 into contact with the lip 50. Due to the minimal axial distance $D_2$, which, as shown in the aspect of the invention in FIG. 2, is no more than 1 to 4 mm, the moment arm created by the arrangement induces a higher closing force to quickly and efficiently seal the vent aperture 38 to prevent liquid fuel spillage. In other words, the lever assembly 20 acts like a vise to close the distance $D_2$ rapidly and forcefully to seal the vent aperture 38.

With reference again to FIG. 2, when the vehicle is uprighted or returned to its substantially horizontal position, any liquid fuel in the chamber 32 is drained through the drainage holes 35 (see FIG. 4) such that the float hanger 76 contacts the first curved surface 66*a* of the hanger extension 64 to place all weight of the float 72 upon the lever arm 60. The resultant moment arm overcomes any pressure differential between an external atmosphere and the chamber 32 to forcefully unseal the sealing surface 70 from the lip 50. Thus, the arrangement creates a higher reopening force to quickly unseal the vent aperture 38 to avoid any "re-opening" problems and allow fuel vapor venting to resume.

While preferred embodiments of the invention have been shown and described, those skilled in the art will recognize that other changes and modifications may be made to the foregoing embodiments without departing from the scope and spirit of the invention. For example, specific pressures and dimensions are set forth for current applications and industry regulations and specific shapes of various elements of the illustrated embodiments may be altered to suit particular applications. It is intended to claim all such changes and modifications as fall within the scope of the appended claims and their equivalents. Moreover, references herein to "top," "lower," "bottom," "upward," "downward," "descending," "ascending," and "side" structures, elements and geometries and the like are intended solely for purposes of providing an enabling disclosure and in no way suggest limitations regarding the operative orientation of the exemplary embodiments or any components thereof.

That which is claimed is:

1. A vent valve assembly for attachment in an aperture of a fuel tank wall, the vent valve assembly comprising:
    a cap member defining a vapor-inlet opening and a vapor-outlet opening therethrough;
    a valve housing attachable to the cap member, the valve housing defining a chamber therein and at least partially disposed within an interior of a fuel tank;
    a float defining a hangar, a perimeter and a catch member depending from proximate the perimeter, the float being disposed in the chamber of the valve housing and responsive to a first vehicle condition and a second vehicle condition;
    a leveraged sealing device movable relative to the vapor-inlet opening to open and close the vapor-inlet opening respectively in the first vehicle condition and in the second vehicle condition;
    means for connecting the float and the leveraged sealing device such that a first movement of the float moves the leveraged sealing device in a direction away from the vapor-inlet opening to disengage the leveraged sealing device from about the vapor-inlet opening in the first vehicle condition to permit fuel vapor discharge from the interior and a second movement of the float moves the leveraged sealing device in a direction of the vapor-inlet opening in the second vehicle condition to prevent the liquid fuel from discharging through the vapor-inlet opening and the vapor-outlet opening; and
    wherein the means for connecting includes a lever arm defining a proximal end and a distal end, the leveraged sealing device interposed between the proximal end and the distal end, the proximal end rotatably connected proximate the cap member and the valve housing, the distal end defining a first surface and a second surface, the first surface rotatably engaged with the hangar, and the second surface engageable with the catch member.

2. The vent valve assembly lever assembly as in claim 1, wherein the hangar of the float is configured to move the distal end in a direction away from the vapor-inlet opening to disengage the leveraged sealing device from about the vapor-inlet opening, the catch member is configured to move the distal end in a direction of the vapor-inlet opening in the second vehicle condition such that the leveraged sealing device becomes substantially parallel to an outside diameter of the vapor-inlet opening to seal the vapor-inlet opening upon initial contact.

3. The vent valve assembly as in claim 1, wherein the leveraged sealing device is spaced apart from the vapor-inlet opening from about 1 mm to about 8 mm in the first vehicle condition, the proximal end of the lever arm connected proximate the cap member and the valve housing such that a rotation of the lever arm limits an axial movement of the float from about 2 mm to about 16 mm in the second vehicle condition.

4. A vent valve assembly for attachment in an aperture of a fuel tank wall, the vent valve assembly comprising:
    a cap member defining a vapor-inlet opening and a vapor-outlet opening therethrough for selective passage of a fuel vapor from an interior of a fuel tank;
    a valve housing attachable to the cap member, the valve housing defining a longitudinal axis and a chamber therein and at least partially disposed within the interior of the fuel tank;
    a float defining a hangar, a perimeter and a catch member depending proximate the perimeter, the float being disposed in the chamber of the valve housing and responsive to a first vehicle condition and a second vehicle condition; and
    a lever arm defining a proximal end, a distal end and a sealing surface therebetween, the proximal end pivotally connected proximate the cap member and the valve housing, the distal end defining a first surface and a second surface, the first surface rotatably engaged with the hangar, the second surface engageable with the catch member, the hangar of the float configured to move the distal end in a direction away from the vapor-inlet opening to disengage the sealing surface from about the vapor-inlet opening in the first vehicle condition to permit the fuel vapor to discharge from the interior of the fuel tank, the catch member configured to move the distal end in a direction of the vapor-inlet opening in the second vehicle condition such that the sealing surface seals the vapor-inlet opening to prevent discharge of a liquid fuel from the interior of the fuel tank.

5. The vent valve assembly as in claim 4, wherein the vapor-inlet opening is formed about the longitudinal axis of the valve housing, the portion of the lever arm spaced apart from the vapor-inlet opening.

6. The vent valve assembly as in claim 4, wherein the chamber of the valve housing defines an inner diameter, the portion of the lever arm spaced apart from the vapor-inlet opening at a distance of at least about one-half of the inner diameter.

7. The vent valve assembly as in claim 4, wherein the valve housing defines a cradle, the proximal end rotatably disposed in the cradle.

8. The vent valve assembly as in claim 4, wherein the lever assembly further includes a sealing block attached to the lever arm, the sealing block angled in cross section, the sealing surface disposed on the sealing block.

9. The vent valve assembly as in claim 8, wherein the lever arm is spaced apart from the vapor inlet opening such that the longitudinal axis extends through the sealing block to align the sealing surface with the vapor-inlet opening.

10. The vent valve assembly as in claim 4, further comprising a resilient lip member defined about the vapor-inlet opening, the sealing surface configured to seal about the resilient lip member to close vapor-inlet opening in the second vehicle condition.

11. The vent valve assembly as in claim 10, wherein the sealing surface defines a surface area larger than an outside diameter of the resilient lip member.

12. The vent valve assembly as in claim 10, wherein the resilient lip member is overmolded with the cap member.

13. The vent valve assembly as in claim 10, wherein the resilient lip member flares circumferentially away from the vapor-inlet opening, the resilient lip member configured to flatten between a base of the cap member and the sealing surface in the second vehicle condition.

14. The vent valve assembly as in claim 10, wherein the resilient lip member is disposed substantially flush with the base of the cap member.

15. The vent valve assembly as in claim 10, wherein the resilient lip member is circumferentially chamfered.

16. The vent valve assembly as in claim 4, wherein a vehicle in the first vehicle condition is on a substantially horizontal plane.

17. The vent valve assembly as in claim 4, wherein a vehicle in the second vehicle condition is on a grade of at least 10 degrees from a horizontal plane.

18. The vent valve assembly as in claim 4, wherein the valve housing defines a fuel vapor entry aperture therethrough, the fuel vapor entry aperture in communication with the vapor-inlet opening to pass the fuel vapor through the vapor-outlet opening in the first vehicle condition.

19. The vent valve assembly as in claim 4, wherein the valve housing defines a plurality of drainage holes therein, the drainage holes configured in the first vehicle condition to drain the liquid fuel accumulated in the chamber during the second vehicle condition to actuate the float such that the sealing surface disengages from about the vapor-inlet opening.

20. The vent valve assembly as in claim 4, wherein the sealing member is spaced apart from the vapor-inlet opening from about 1 mm to about 8 mm in the first vehicle condition, the proximal end of the lever arm connected proximate the cap member and the valve housing such that a rotation of the lever assembly limits an axial movement of the float from about 2 mm to about 16 mm in the second vehicle condition.

21. A vent valve assembly for attachment in an aperture of a fuel tank wall, the vent valve assembly comprising:
a cap member defining a vapor-inlet opening and a vapor-outlet opening therethrough for selective passage of a fuel vapor from an interior of a fuel tank, the vapor-inlet opening defining an outside diameter;
a valve housing attachable to the cap member, the valve housing defining a longitudinal axis and a chamber therein and at least partially disposed within the interior of the fuel tank;
a float defining a catch member and a hangar depending from proximate the catch member, the float being disposed in the chamber of the valve housing and responsive to a first vehicle condition and a second vehicle condition; and
a lever assembly including a lever arm defining a proximal end and a distal end and a sealing device interposed between the proximal end and the distal end, a lever arm axis being defined by the proximal end and the distal end, the proximal end rotatably connected proximate the cap member and the valve housing, the sealing device defining a sealing surface thereon, the sealing surface defining a plane that intersects the lever arm axis such that the sealing surface precedes the lever arm axis as the float responds to a second vehicle condition, the lever arm spaced apart from the vapor inlet opening such that the longitudinal axis extends through the sealing device to align the sealing surface with the vapor-inlet opening, the distal end rotatably engaged with the hanger of the float, the hangar of the float configured to move the distal end in a direction away from the vapor-inlet opening to disengage the sealing surface from about the vapor-inlet opening in the first vehicle condition to permit fuel vapor discharge from the interior of the fuel tank, the catch member configured to move the distal end in a direction of the vapor-inlet opening in the second vehicle condition such that the sealing surface becomes substantially parallel to the outside diameter to seal the vapor-inlet opening to prevent fuel vapor discharge from the interior of the fuel tank.

22. The vent valve assembly as in claim 21, wherein the chamber of the valve housing defines an inner diameter, the distal end spaced vertically apart from the vapor-inlet opening at a distance of at about one-third to about one-half of the inner diameter.

23. The vent valve assembly as in claim 21, wherein the valve housing defines a cradle, the proximal end rotatably disposed in the cradle.

24. The vent valve assembly as in claim 21, wherein the float defines a perimeter, the catch member depending from proximate the perimeter, the distal end defining a first surface and a second surface, the first surface rotatably engaged with the hangar, the second surface engageable with the catch member 25. The vent valve assembly as in claim 21, further comprising a resilient lip member defined about the vapor-inlet opening, the sealing surface being larger than an outside diameter of the resilient lip member and configured to seal about the outside diameter of the resilient lip member to close vapor-inlet opening in the second vehicle condition.

26. The vent valve assembly as in claim 25, wherein the resilient lip member is overmolded with the cap member.

27. The vent valve assembly as in claim 21, wherein the valve housing defines a fuel vapor entry aperture therethrough, the fuel vapor entry aperture in communication with the vapor-inlet opening to pass the fuel vapor through the vapor-outlet opening in the first vehicle condition.

28. The vent valve assembly as in claim 21, wherein the valve housing defines a plurality of drainage holes therein, the drainage holes configured to drain the liquid fuel accumulated in the chamber in the second vehicle condition to actuate the float such that the sealing surface disengages from about the vapor-inlet opening in the first vehicle condition.

29. The vent valve assembly as in claim 21, wherein the sealing member is spaced apart from the vapor-inlet opening from about 1 mm to about 8 mm in the first vehicle condition, the proximal end of the lever arm connected proximate the cap member and the valve housing such that a rotation of the lever assembly limits an axial movement of the float from about 2 mm to about 16 mm in the second vehicle condition.

30. The vent valve assembly as in claim 21, further comprising an annular ring depending from the valve housing, the annular ring configured to press into a portion of the cap member to hold the valve housing and the cap member together and to seal off communication between the valve housing and an external atmosphere.

31. A vent valve assembly for attachment in an aperture of a fuel tank wall, the vent valve assembly comprising:
   a cap member defining a vapor-inlet opening and a vapor-outlet opening therethrough configured for selective passage of a fuel vapor from an interior of a fuel tank;
   a valve housing attachable to the cap member, the valve housing defining a chamber therein and at least partially disposed within the interior of the fuel tank;
   a float defining a hangar, a perimeter, and a catch member depending proximate the perimeter, the float disposed in the chamber of the valve housing and responsive to a first vehicle condition and a second vehicle condition;
   a lever arm defining a proximal and distal end, the proximal end connected proximate the valve housing and the cap member, the distal end defining a first surface and a second surface, the first surface rotatably engaged with the hangar, the second surface engageable with the catch member; and
   a sealing surface disposed proximate the lever arm and movable relative to the vapor-inlet opening to open and close the vapor-inlet opening respectively in the first vehicle condition and in the second vehicle condition.

32. The vent valve assembly as in claim 31, wherein the valve housing defines a fuel vapor entry aperture therethrough, the fuel vapor entry aperture in communication with the vapor-inlet opening to pass the fuel vapor through the vapor-outlet opening in the first vehicle condition.

33. The vent valve assembly as in claim 31, wherein the valve housing defines a plurality of drainage holes therein, the drainage holes configured to drain a liquid fuel accumulated in the chamber in the second vehicle condition to actuate the float such that the sealing surface disengages from about the vapor-inlet opening in the first vehicle condition.

34. The vent valve assembly as in claim 31, wherein a first movement of the float moves the sealing surface in a direction away from the vapor-inlet opening to disengage the sealing surface from about the vapor-inlet opening in the first vehicle condition to permit fuel vapor discharge from the interior and a second movement of the float moves the sealing surface in a direction of the vapor-inlet opening in the second vehicle condition to prevent a liquid fuel from discharging through the vapor-inlet opening and the vapor-outlet opening.

\* \* \* \* \*